United States Patent [19]
Kuznicki et al.

[11] Patent Number: 5,882,624
[45] Date of Patent: Mar. 16, 1999

[54] ETS-14 CRYSTALLINE TITANIUM SILICATE MOLECULAR SIEVES, MANUFACTURE AND USE THEREOF

[75] Inventors: Steven M. Kuznicki, Whitehouse Station; Jacqueline S. Curran, Cranford; Xiaolin Yang, Edison, all of N.J.

[73] Assignee: Englehard Corporation, Iselin, N.J.

[21] Appl. No.: 790,944

[22] Filed: Jan. 29, 1997

[51] Int. Cl.$^6$ ............................ C01B 33/20; C01B 33/32; C25B 11/04; H01M 4/02
[52] U.S. Cl. ............................ 423/700; 423/712; 423/713; 423/718; 423/326; 423/332; 423/333; 204/291; 429/218
[58] Field of Search ...................................... 423/700, 712, 423/718, 326, 332, 333, 713; 204/291; 429/218

[56] References Cited

U.S. PATENT DOCUMENTS

| | | |
|---|---|---|
| 3,415,736 | 12/1968 | Ciric . |
| 3,760,062 | 9/1973 | Sand et al. .............................. 423/700 |
| 3,798,311 | 3/1974 | Guth et al. .............................. 423/700 |
| 4,247,416 | 1/1981 | Doherty et al. . |
| 4,410,501 | 10/1983 | Taramasso et al. ..................... 423/713 |
| 4,457,989 | 7/1984 | Coetzer . |
| 4,853,202 | 8/1989 | Kuznicki et al. . |
| 5,453,263 | 9/1995 | Blosser et al. ........................... 523/713 |
| 5,695,736 | 12/1997 | Saxton et al. ............................ 423/700 |

OTHER PUBLICATIONS

Liu Yunling, et al, "Synthesis of a New Titanoslicate: An Analog of the Mineral Penkvilksite", Chemical Communications, Aug. 7, 1997, Ciety of Chemistry GB, pp. 1467–1468.

Lin Zhi, et al, "Synthesis and Structural Characterization of Microporous Umbite, Penkvilksite, and Other Titanosilicates", Journal of Physical Chemistry B, vol. 101, No. 36, 4 Sep. 1997, pp. 7114–7120.

A.N. Merkov, I.V. Bussen, E.A. Gofko, E.A. Kulchitskaya, Yu. P. Menshikov, and A.P. Nedorezova, Zap. Vses. Mineralog. 102. 54 (1973).(No month).

I.V. Bussen, Yu. P. Menshikov, A.N. Merkov, A. P. Nedorezova, Ye.I. Uspenskaya, and A.P. Khomyakov,(1975) Penkvilsite, a new titanium–sodium hydrosilicate. Doklady Earth Science Section, 217, 126–129(translated from Doklady Akademii Nauk SSSR, 217, 1161–1164) (1974).(No month).

M. Fleischer, New Mineral Names, American Mineralogist, 60, pp. 340–341 (1975).(No month).

P.A. Sandomirskii and N.V. Belov, The OD Structure of Zorite, Soviet Physical Crystallography, (6)(1975).(No month).

S. Merline, M. Pasero, G. Arioli, A.P. Khomyakov, Penkvilksidte, a new kind of silicate structure: OD charcater, X–ray single–crystal (1M), and powder Rietveld (20) refinements of two MDO polytypes, American Mineralogist, 79, pp. 1185–1193.(No month)

Primary Examiner—Mark L. Bell
Assistant Examiner—David Sample
Attorney, Agent, or Firm—Inez L. Moselle

[57] ABSTRACT

A novel crystalline titanium silicate designated ETS-14 molecular sieve is disclosed and characterized. ETS-14 may be prepared by heating ETS-10 molecular sieve in the form of an aqueous gel or incorporating crystals of ETS-10 with an aqueous source of sodium that is essentially free from potassium.

10 Claims, 6 Drawing Sheets

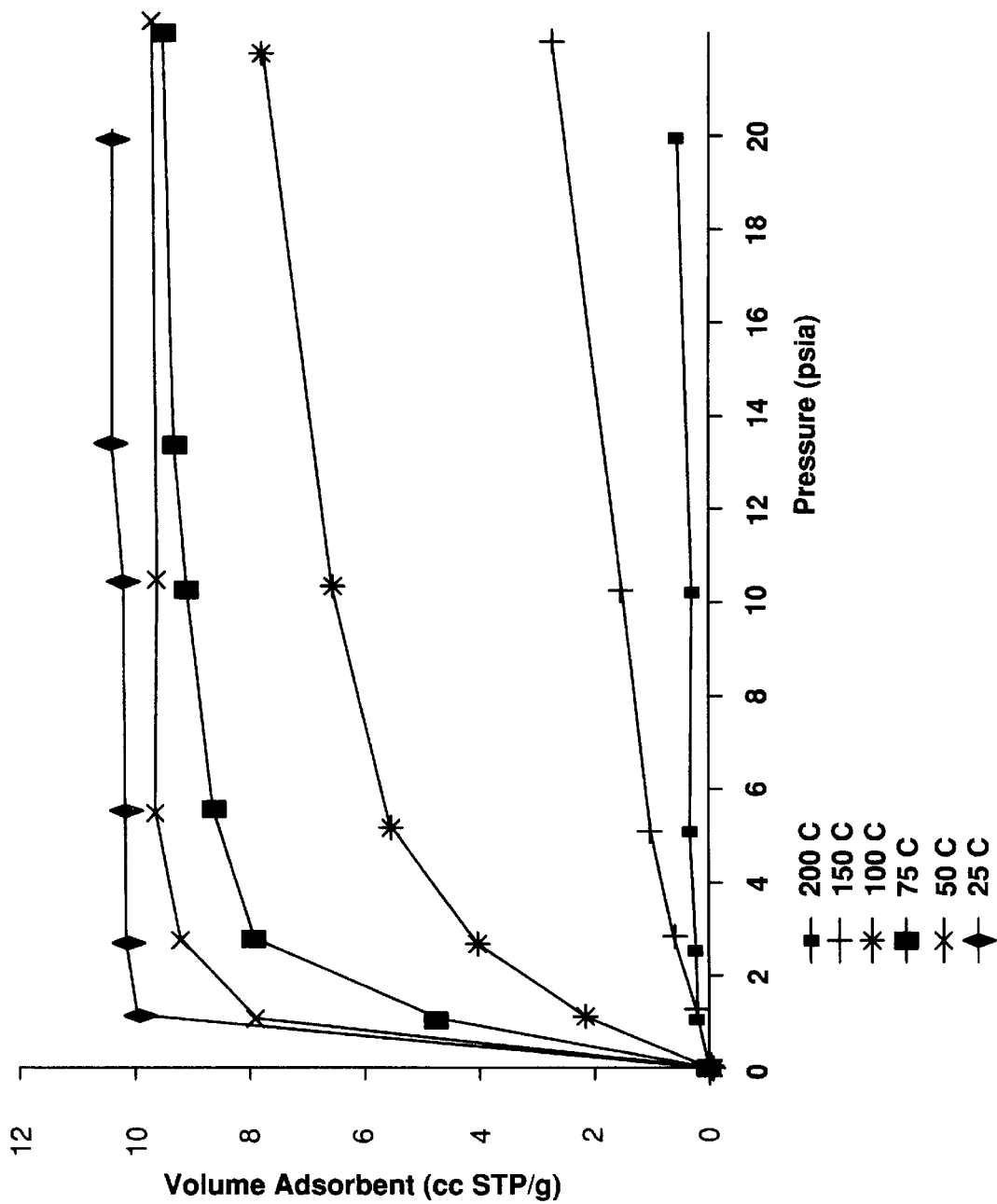

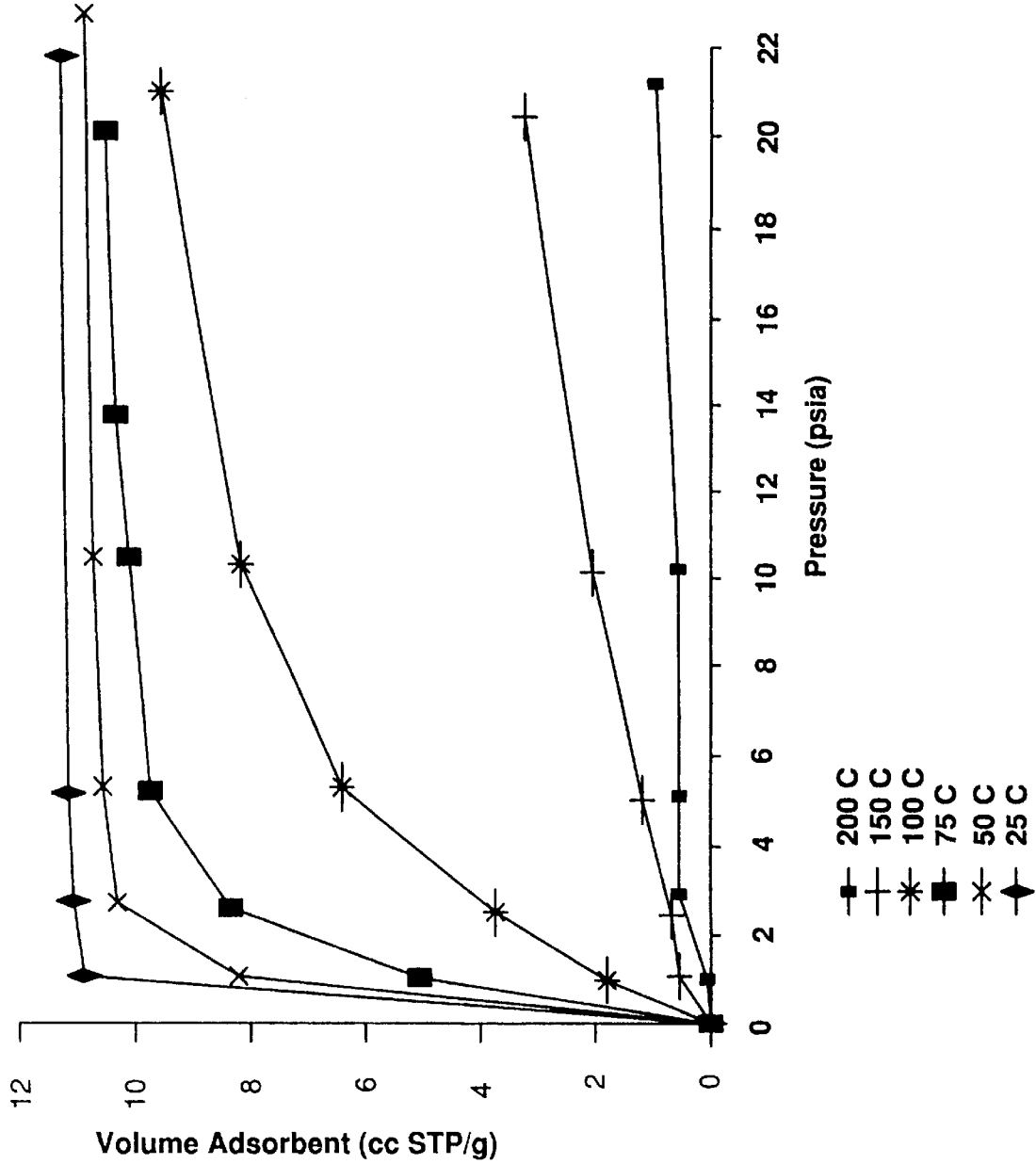

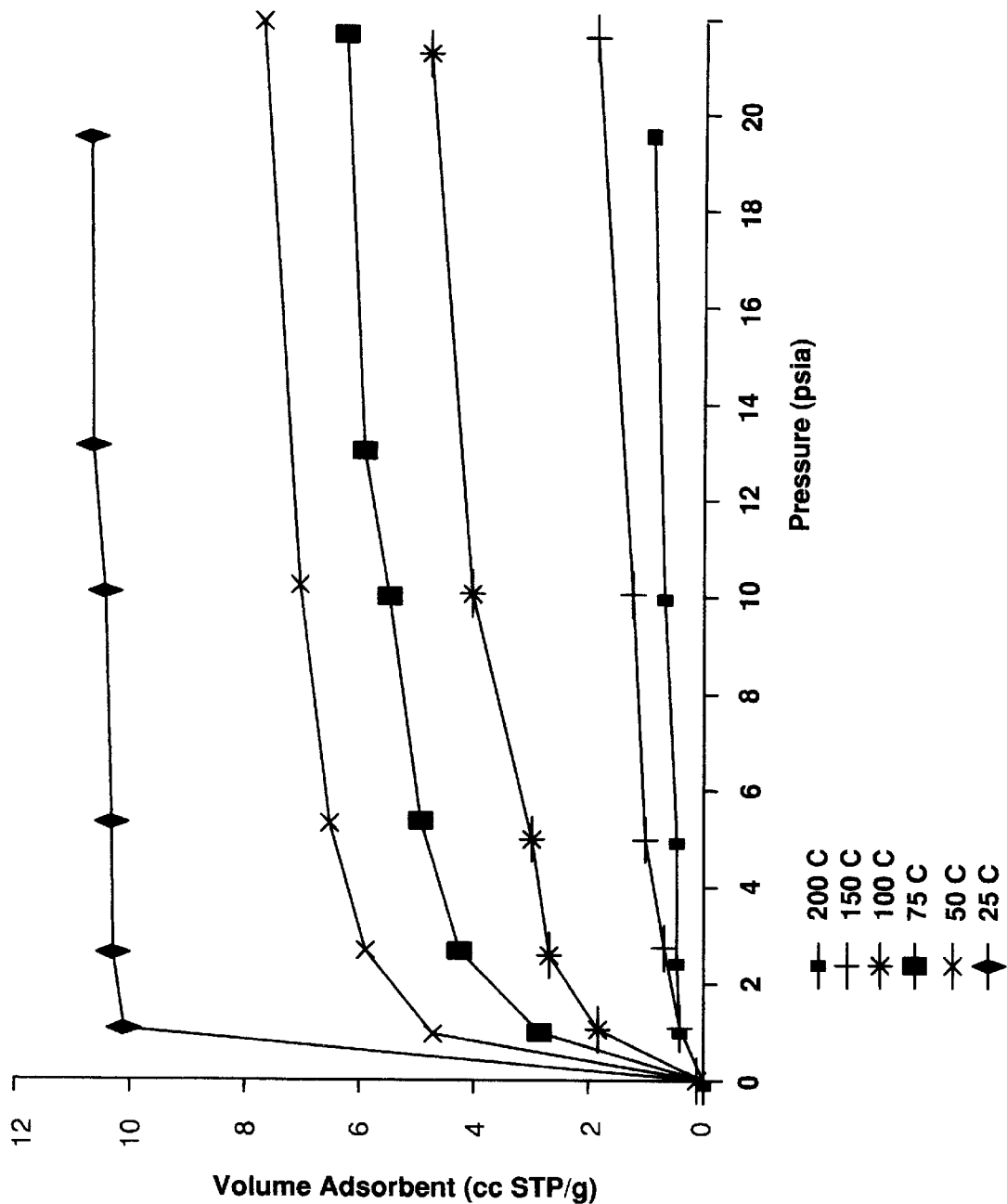

ETS-14 CRYSTALLINE TITANIUM SILICATE MOLECULAR SIEVES, MANUFACTURE AND USE THEREOF

FIELD OF THE INVENTION

This invention relates to a novel crystalline porous titanium silicate, hereinafter ETS-14, and to methods of manufacture thereof. The invention also relates to the use of ETS-14 as an ion-exchange agent, especially in the selective removal and concentration of lithium ions from cationic mixtures.

BACKGROUND OF THE INVENTION

The titanium silicate mineral penkvilksite is available only in trace quantities and therefore its chemical properties are unknown and difficult to analyze. The chemical composition of ETS-14 is similar to that of penkvilksite but the morphology differs substantially from that of the structurally related mineral.

The following references relate to the mineral penkvilksite:

A. N. Merkov, I. V. Bussen, E. A. Gofko, E. A. Kulchitskaya, Yu P. Menshikov, and A. P. Nedorezova, Zap. Vses. Mineralog. 102. 54 (1973).

I. V. Bussen, Yu. P. Menshikov, A. N. Merkov, A. P. Nedorezova, Ye. I. Uspenskaya, and A. P. Khomyakov, (1975) Penkvilksite, a new titanium-sodium hydrosilicate. Doklady Earth Science Section, 217, 126–129 (translated from Doklady Akademii Nauk SSSR, 217, 1161–1164) (1974).

M. Fleischer, New Mineral Names, American Mineralogist, 60, pp 340–341 (1975).

P. A. Sandomirskii and N. V. Belov, The OD Structure of Zorite, Soviet Physical Crystallography, 24 (6) (1975).

S. Merlino, M. Pasero, G. Artioli, A. P. Khomyakov, Penkvilksite, a new kind of silicate structyre: OD character, X-ray single-crystal (1M), and powder Rietveld (20) refinements of two MDO polytypes, American Mineralogist, 79,pp 1185–1193 (1994).

SUMMARY OF INVENTION

One aspect of the present invention relates to the synthesis of a new crystalline titanium silicate phase structurally related to the rare mineral penkvilksite. This crystalline titanium silicate molecular sieve zeolite has a pore size of approximately 3 to 5 Angstrom units and a composition in terms of mole ratios of oxides as follows:

$$1.0\pm0.25\ M_{2/n}O:1.00\ TiO_2:y\ SiO_2:z\ H_2O$$

wherein M is at least one cation having a valence of n, y is from 2 to 20,usually 3 to 7 and, most usually, 2 to 6, and z is from 0 to 100, said zeolite being characterized by an x-ray powder diffraction pattern having at least the significant lines and relative intensities set forth in Table I of the specification and the crystallite morphology set forth in FIG. 1 of the specification.

In the as synthesized form, M is sodium.

In a preferred embodiment of the invention, preferably at least a portion, preferably at least 90% of M is lithium and the balance is sodium. Thus an embodiment of the invention embraces novel lithium molecular sieve; having the composition $1.0\pm0.25\ Li_2O:TiO_2:3-7\ SiO_2:0-100\ H_2O$ and an x-ray diffraction pattern having at least the significant lines and relative intensities set forth in table I of the specification.

In accordance with this invention, ETS-14 is synthesized in hydrothermal systems resembling those used to synthesize ETS-10 (U.S. Pat. No. 4,853,202 Kuznicki et al) but using sodium exclusively in the reaction mixture in place of the mixture of sodium and potassium known to be useful in synthesizing ETS-10. While ETS-10 appears stable in mixed sodium-potassium hydrothermal environments for prolonged (perhaps even indefinite) periods of time, in potassium free (pure sodium) gels intended to synthesize large individual crystals of ETS-10, ETS-14 has been observed as the "breakdown" product of ETS-10, forming as ETS-10 disappears.

From the XRD pattern of ETS-14, it is clear that it is structurally related to the mineral penkvilksite (Table I), although substantial shifting and relative intensity differences are clearly noted when a comparison is made to the literature. In addition to shifting and intensity differences, ETS-14 contains significant peaks not noted in either natural form of penkvilksite as can be seen in the aforementioned table. ETS-14 appears a better match to the 20 polytype of penkvilksite (vs. the 1M polytype) according to the published XRD tables of Merlino, et al as presented in Table 1 of this application. However, the X-ray pattern for ETS-14 is not an exact match for either. ETS-14 has a much more clearly defined physical morphology as presented in FIG. 1 than the mineral penkvilksite as presented in FIG. 2. While aggregates of mineral penkvilksite demonstrate poorly defined crystal morphology, ETS-14 forms as well-defined "rose" shaped clusters of larger platy crystals.

In its ion-exchange behavior, ETS-14 is unlike either other ETS materials or classical zeolites. Only partial exchange of $Mg^{2+}$, $Sr^{2+}$, $Ca^{2+}$, $H^+$ or $NH_4^+$ is achieved. However, sodium may be completely displaced by lithium in one exchange step, unlike any other known zeolite. The completeness of lithium exchange is evident in FIG. 3 where as synthesized (sodium) ETS-14 is exposed to various cations and the amount of the remaining (unexchanged) sodium is monitored by NMR. Unlike any of the other cations, essentially no sodium signal is seen after lithium exchange (i.e. the sodium is essentially completely displaced by lithium). Classical zeolites (and ETS materials) may be grudgingly (and usually only partially) lithium exchanged, uniformly showing selectivity toward heavier, more polarizable cations. Quantitatively lithium exchangeable sieves such as ETS-14 may be used as an electrode in advanced lithium batteries or other applications where reversible affinity toward lithium is desirable or as desiccants in systems where only lithium ions are tolerable such as conventional lithium batteries.

BRIEF DESCRIPTION OF DRAWINGS

FIG. 5: Water adsorption isotherms for as synthesized Na ETS-14 showing zeolite-like behavior.

FIG. 6: Water adsorption isotherms for Li-ETS-14 showing increased water capacity with smaller cation.

FIG. 7: Water adsorption isotherms for Ca-ETS-14 showing modified isotherm shapes with divalent cation.

DETAILED DESCRIPTION OF INVENTION

Figure 4:
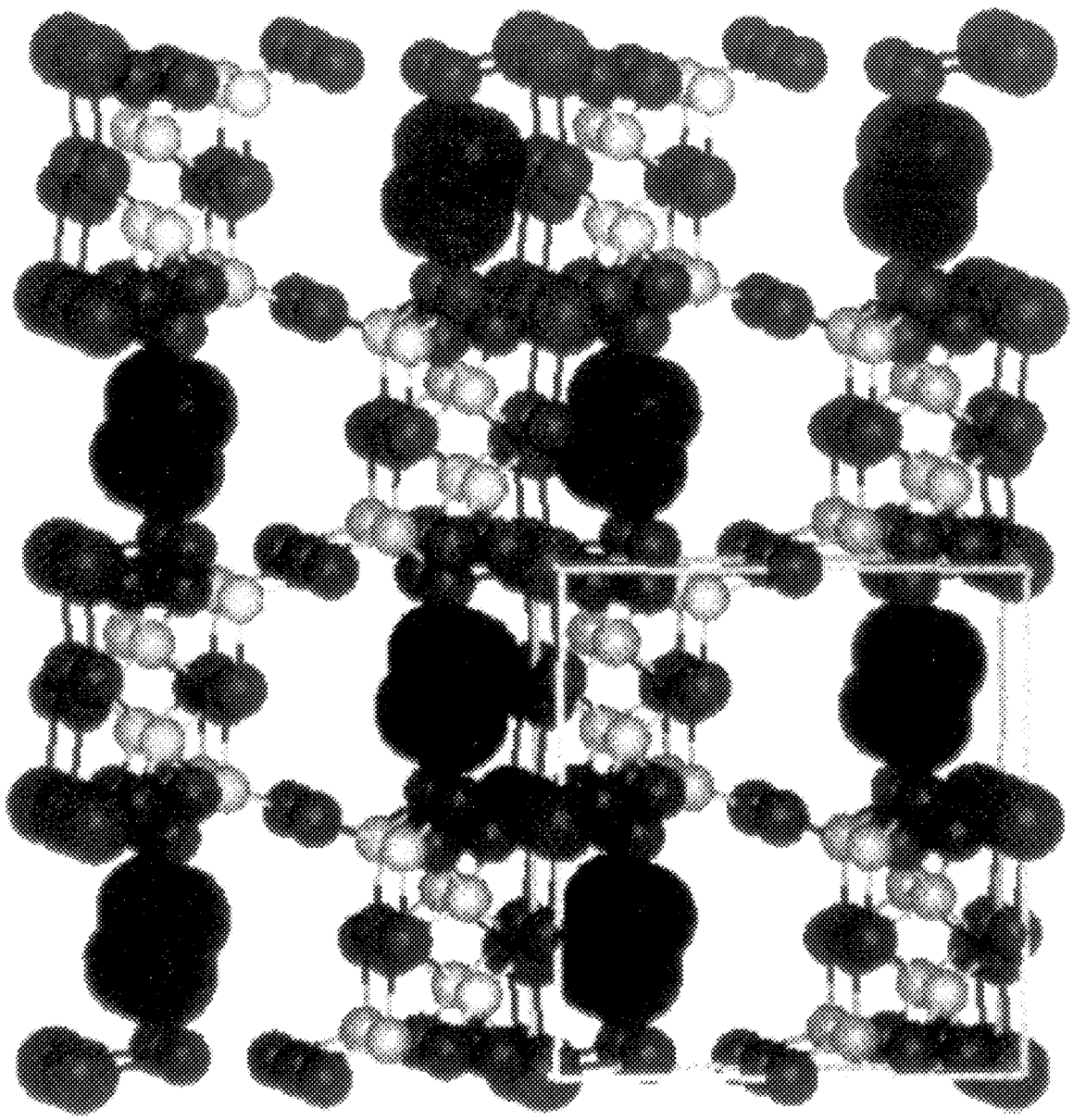
FIG. 4: Atomic structure of penkvilksite-like materials calculated from published atomic positions.

From the published atomic positions, as reported by Merlino, et al, the structure of penkvilksite-like phases give the appearance of small pored molecular sieves (FIG. 4). From the similarities in XRD patterns, ETS-14 can be assumed to have a basic framework structure closely resembling that of the different polymorphs of penkvilksite. ETS-14, therefore, would be expected to be uniformly microporous and capable of adsorbing small gas molecules such as water vapor.

Water adsorption isotherms for ETS-14, both as prepared (FIG. 5 and for samples modified by ion-exchange (FIGS. 6 and 7) are rectangular and appear classically zeolitic. Materials modified by ion-exchange treatments such as lithium (which raises the water capacity) or calcium (which substantially changes the isotherm shapes), also yield zeolite-like water isotherm shapes (FIGS. 6 and 7).

Compositionally, on a volatile free weight basis (composition after heating to 1100° C.), ETS-14 is found to be approximately 15+/−1 weight percent $Na_2O$, 66+/−3 weight percent $SiO_2$, and 18+/−1 weight percent $TiO_2$. The as crystallized sample originally contains about 10% $H_2O$, by weight. This yields a $SiO_2/TiO_2$ molar ratio of approximately 4.76 and Na/Ti molar ratio of slightly greater than 2 (2.12), indicating that the titanium is indeed octahedrally coordinated Ti(IV). A comparable analysis for penkvilksite yields results within one or two percent, indicating that ETS-14 and other penkvilksite-like phases represent an essentially fixed elemental composition with nearly invariant atomic ratios (much like other ETS materials). This is quite different from classical aluminosilicate zeolites.

TABLE I

XRD POWDER PATTERN OF ETS-14 AND
PENKVILKSITE-1M & 2O FOR 2θ FROM 0–40 DEGREES

| ETS-14 | | PENKVILK-SITE-1M (a) | | PENKVILK-SITE-2O (a) | |
|---|---|---|---|---|---|
| d (obs.) | $I/I_0$ | d (obs.) | $I/I_0$ | d (obs.) | $I/I_0$ |
| 8.10 | 80 | 8.28 | s | 8.21 | 100 |
| 5.93 | 30 | 6.02 | mw | 5.99 | 35 |
| 5.61 | 10 | | | 5.66 | 13 |
| 5.30 | 60 | 5.30 | ms | 5.34 | 62 |
| 4.62 | 40 | | | 4.65 | 30 |
| 4.35 | 10 | | | 4.38 | 16 |
| 4.24 | 10 | | | | |
| 4.06 | 30 | 4.14 | v. | 4.09 | 20 |
| 3.91 | 20 | 3.99 | ms | 3.93 | 14 |
| | | | | 3.86 | 5 |
| 3.68 | 10 | 3.67 | w | 3.70 | 9 |
| 3.59 | 10 | | | | |
| 3.41 | 40 | 3.39 | mw | 3.42 | 29 |
| 3.36 | 100 | 3.34 | s | 3.37 | 69 |
| 3.29 | 60 | | | 3.31 | 49 |
| 3.13 | 10 | 3.13 | m | 3.15 | 12 |
| 3.09 | 70 | | | 3.10 | 48 |
| 3.05 | 100 | | | 3.06 | 56 |
| | | 2.88 | s | 2.88 | 5 |
| 2.82 | 70 | | | 2.83 | 43 |
| 2.77 | 10 | | | 2.79 | 7 |
| 2.74 | 30 | 2.72 | w | 2.75 | 24 |
| 2.71 | 30 | 2.69 | w | 2.71 | 22 |
| 2.66 | 90 | 2.66 | w | 2.68 | 56 |
| 2.61 | 10 | | | 2.62 | 5 |
| 2.57 | 40 | | | 2.58 | 28 |
| 2.50 | 30 | | | 2.51 | 12 |
| 2.45 | 50 | | | 2.47 | 14 |
| | | | | 2.46 | 19 |
| 2.42 | 10 | | | 2.43 | 7 |
| 2.35 | 30 | | | 2.36 | 12 |

(a) = as reported in Merlino, et al. with cross reference, American Mineralogist, 79, pp 1185–1193 (1994).

While these three species are clearly of related structure, each contains and omits significant diffraction lines when compared to the other two. Five significant diffraction peaks appear common to all three penvilksite type materials. These appear at 8.20+/−0.20 angstroms, 5.30+/−0.10 angstroms, 3.95+/−0.10 angstroms, 3.35+/−0.05 angstroms and 3.14+/−0.05 angstroms. The specific form of ETS-14 generated in the experimental work of the inventors is consistently observed as the specific lines portrayed in the first column of Table 1 (ETS-14). However, it is probable that extension and modification of the procedures described herein would also result in the production of the materials described in the second and third columns of Table 1 (Penkvilksite type 1M and type 2O), as well as potentially generate new phases related to mineral penkvilksite.

ETS-14 molecular sieve zeolites can be prepared from a reaction mixture containing a titanium source such a titanium trichloride or titanium oxychloride, a source of silica, a source of sodium, such as a sodium hydroxide, water and, optionally, a mineralizer such as sodium fluoride, the reaction mixture having a composition expressed as mole ratios falling within the following ranges:

TABLE II

| | Broad | Preferred | Most Preferred |
|---|---|---|---|
| $SiO_2/TiO_2$ | 2–100 | 3–10 | 4–7 |
| $H_2O/SiO_2$ | 2–100 | 5–50 | 10–25 |
| $Na_2O/SiO_2$ | 0.1–10 | 0.5–5 | 1–3 |

The reaction mixture is heated to a temperature of from about 50° C. to 500° C. under autogeneous pressure for a period of time ranging from about 0.5 hours to 40 days, or more. The hydrothermal reaction is carried out until crystals are formed and the resulting crystalline product is thereafter separated from the reaction mixture, cooled to room temperature, filtered and washed with deionized water in amounts sufficient to remove free caustic. The reaction mixture can be stirred although it is not necessary. It has been found that when using gels, stirring is unnecessary but can be employed. When using sources of titanium which are solids, stirring is beneficial. The preferred temperature range is 150° C. to 250° C. for a period of time ranging from 4 hours to 15 days. Crystallization is performed in a continuous or batchwise manner under autogenous pressure in an autoclave or static bomb reactor. Following a water washing step, the crystalline ETS-14 is dried at temperatures of 50° C. to 500° C. for periods up to 30 hours.

As mentioned, use of mineralizers such as sodium fluoride is optional. Mineralizers assist in solubilizing a solid titanium source such as $Ti_2O_3$ or $TiO_2$. However, when titanium silicates are prepared from gels, the benefits of a mineralizer are greatly diminished.

The silica source includes most reactive sources of silicon such as silica, silica hydrosol, silica gel, silicic acid, alkoxides of silicon, alkali metal silicates, preferably sodium, or mixtures of the foregoing.

The titanium oxide source is a trivalent compound such as titanium trichloride or titanium sesquioxide or a tetravalent source such as $TiOCl_2$ or $TiO_2$.

The source of alkalinity is preferably an alkali metal hydroxide, such as sodium hydroxide, which provides a source of alkali metal ions for maintaining electrovalent neutrality and controlling the pH of the reaction mixture within the range of 9.0 to 11.0±0.1. The alkali metal hydroxide serves as a source of sodium oxide which can also be supplied by an aqueous solution of sodium silicate.

The titanium silicate molecular sieve zeolites prepared according to the invention contain no deliberately added alumina, and may contain very minor amounts of $Al_2O_3$ due to the presence of one or more impurities in the reagents employed, e.g. sodium silicate, and in the reaction equipment. The molar ratio of $SiO_2/Al_2O_3$ can be infinite or at least higher than 20 or more dependent upon the purity of reactants employed.

The crystalline titanium silicate as synthesized can have the original cationic content thereof replaced by a wide variety of other cations according to techniques well known in the art. Typical replacing components include hydrogen, ammonium, alkyl ammonium and aryl ammonium and metals, including mixtures of the same. The hydrogen form may be prepared, for example, by substitution or original sodium with ammonium. The composition is then calcined at a temperature of, say, 1000° F., resulting in the evolution of ammonia and retention of hydrogen in the composition, i.e., hydrogen and/or decationized form. Of the replacing metals, preference is accorded to metals of Groups II, IV and VIII of the Periodic Table, most preferably the rare earth metals.

The crystalline titanium silicates are then preferably washed with deionized water in amounts sufficient to remove free caustic and dried at a temperature ranging from 50° C. to about 500° C. and thereafter calcined in air or other inert gas at temperatures ranging from above 500° C. to 1000° C. for periods of time ranging from 1 to 48 hours or more.

Regardless of the synthesized form of the titanium silicate the spatial arrangement of atoms which form the basic crystal lattice remain essentially unchanged by the replacement of the initial sodium as determined by an X-ray powder diffraction pattern of the resulting titanium silicate. The X-ray diffraction patterns of such products are essentially the same as those presented in Table I above.

The crystalline titanium silicates prepared in accordance with the invention can be formed in a wide variety of particle sizes. The particles can be in the form of powder, a granule or a molded product such as an extrudate having a particle size sufficient to pass through a 4 mesh (Tyler) screen and be maintained on a 400 mesh (Tyler) screen in cases where the catalyst is molded such as by extrusion. The titanium silicate can be extruded before drying or dried or partially dried and then extruded.

Values for the XRD powder pattern of products of this invention were determined by standard techniques. The radiation was a K-alpha doublet of copper, and a scintillation detector was used. The particular instrument employed was the Phillips APD 1700 automated computerized diffractometer. The peak heights, I, and the positions as a function of 2 times theta, where theta is the Bragg angle, were automatically recorded by the computerized diffractometer unit. From these, the relative intensities, 100 $I/I_o$ where $I_o$ is the intensity of the strongest line or peak, and d (obs.), the interplanar spacing in angstroms, corresponding to the recorded lines, were established. All samples were air equilibrated at ambient temperature and humidity before analysis. It should be noted that a theta compensator was employed in analysis.

It should be understood that the reported X-ray diffraction pattern is characteristic of all ion-exchanged forms of ETS-14 compositions. Ion-exchange of the initial sodium ions with other cations reveals substantially the same pattern with only minor shifts in interplanar spacing and variation in relative intensity. Various cation exchanged forms of ETS-14 have been prepared and their X-ray powder diffraction patterns contain the most significant lines set forth in Table I.

The following examples are illustrative of the invention.

EXAMPLE 1

ETS-14 was prepared as follows: An alkaline silicate solution was prepared by mixing the following reactants in the following order:

Mixture I: 300 grams $N^R$ Brand sodium silicate solution
128 grams 50% (weight) NaOH solution
4.8 grams ETS-10 crystals (air equilibrated)

A titanium solution was prepared by combining the following reactants in the following order:

Mixture II: 328 grams deionized water
84.0 grams concentrated HCl (approximately 37.5 wt. %)
84.0 grams Titanium oxychloride solution (Kemira 36% $TiOCl_2$ by weight)

A portion of mixtures I and II were combined by pouring one-fourth of mixture II into one-fourth of mixture I and hand stirring until a thick gelatinous mixture was obtained. This combined mixture was autoclaved under autogenous pressure at 200° C. for one week and a highly crystalline product was obtained. The crystalline product was filtered, and washed with deionized water in an amount sufficient to remove free caustic and dried at approximately 100° C.

It was expected that this reaction mixture would result in large crystals of ETS-10, as such mixtures show reasonably large crystals after 24 hours. However, a new phase, ETS-14, was observed.

EXAMPLES 2–8

Gel mixtures identical to that of Example 1 were made and approximately 10-gram portions placed in seven 15-cc Teflon® lined autoclaves. The small autoclaves were placed in a 200° C. oven and one autoclave was removed each day for seven days. It was found that at the end of day one ETS-10 was the dominant crystalline product. However, by day two, the new phase, ETS-14, was forming as ETS-10 was declining. From day three through day seven, only ETS-14 was observed as a crystalline product.

As with classical zeolites, in this system ETS-10 is meta-stable. In classical zeolites it is not unusual to observe the breakdown product of a very "open" zeolite structure "condense" to a less open, generally smaller pored species. In this system, ETS-10 appears to mimic classical zeolites in the generation of ETS-14, a denser phase.

The following is a description of a procedure used to essentially completely lithium exchange ETS-14 in one step.

EXAMPLES 9

20.0 grams of lithium chloride were dissolved with 20.0 grams of deionized H2O and 8.0 grams of ETS-14 (as synthesized sodium form) was added. The mixture was loaded into a 50 cc static autoclave and heated to 150° C. for four hours. The resultant lithium treated ETS-14 was thoroughly washed with deionized water and dried at 100° C. in a forced air oven. Wet chemical elemental analysis yielded the following concentrations of sodium and lithium:

|  | As Synthesized ETS-14 | Li Exchanged ETS-14 |
| --- | --- | --- |
| Na (VF basis) | 11.46% | 122.3 ppm (0.012%) |
| Li (VF basis) | <1.0 ppm | 3.96% |

(VF = Volatile free weight, i.e. weight after heating to about 1000° C.)

Thus, nearly 99.9% of the cationic sodium was exchanged by lithium in a single exchange step. The inventors know of no similar behavior in any zeolite-like material.

There are a number of situations where an essentially pure ion-exchange agent in the lithium form can find utility. Among others, exchangeable cathodes for advanced lithium batteries could utilize this unusual property. In another usage, existing lithium batteries could be desiccated by such a material as the lithium ion-exchanged form of ETS-14 without the possible introduction of trace levels of other damaging cations. Trace levels of contaminant cations severely negatively impact the performance of any type of electrical cell.

With the availability of ETS-14, new applications in catalysis and adsorption are also likely, both being areas of recent interest for other structured titanium silicate phases.

Figure 1:
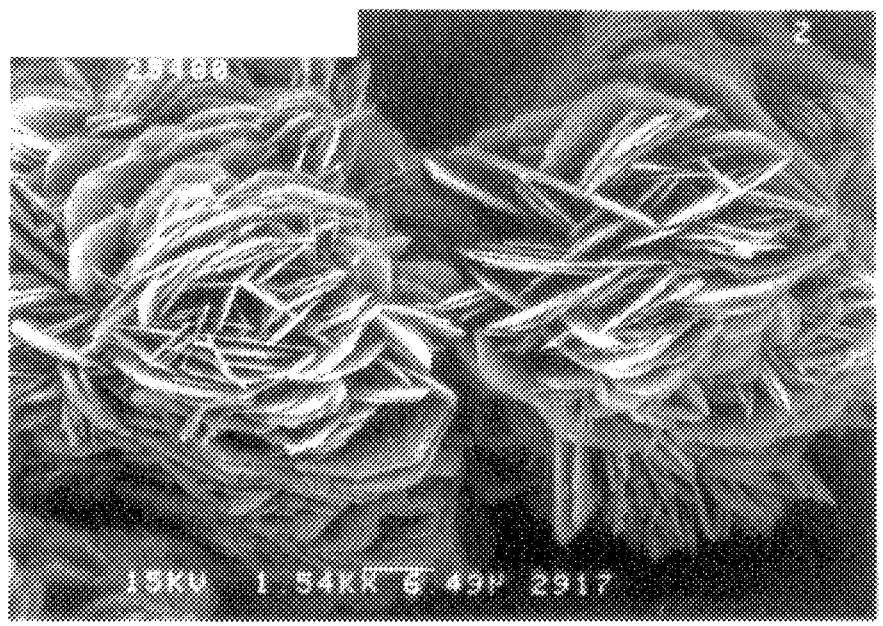
FIG. 1: Scanning -electron micrograph of ETS-14.
Figure 2:
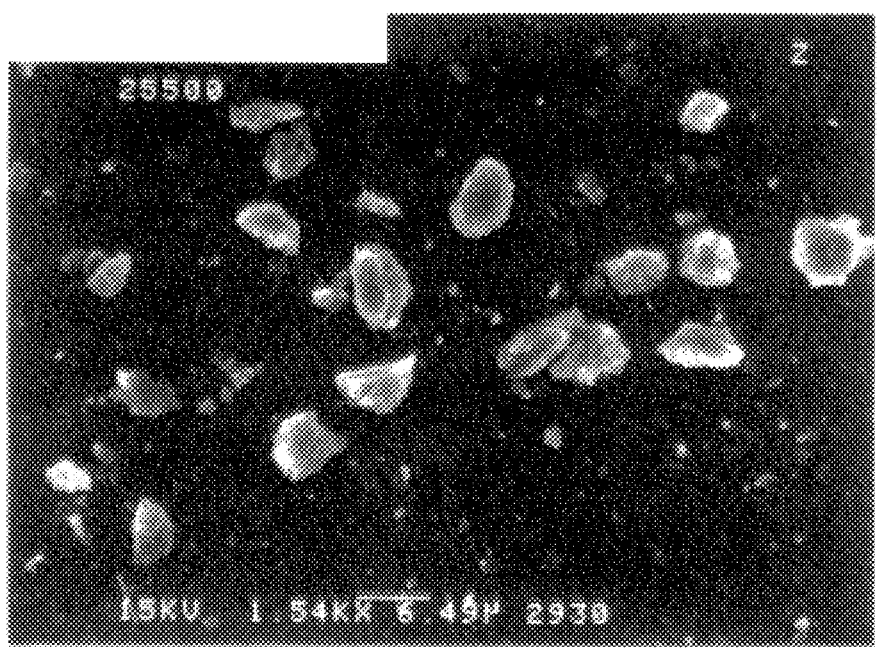
FIG. 2: Scanning electron micrograph of penkvilksite.
Figure 3:
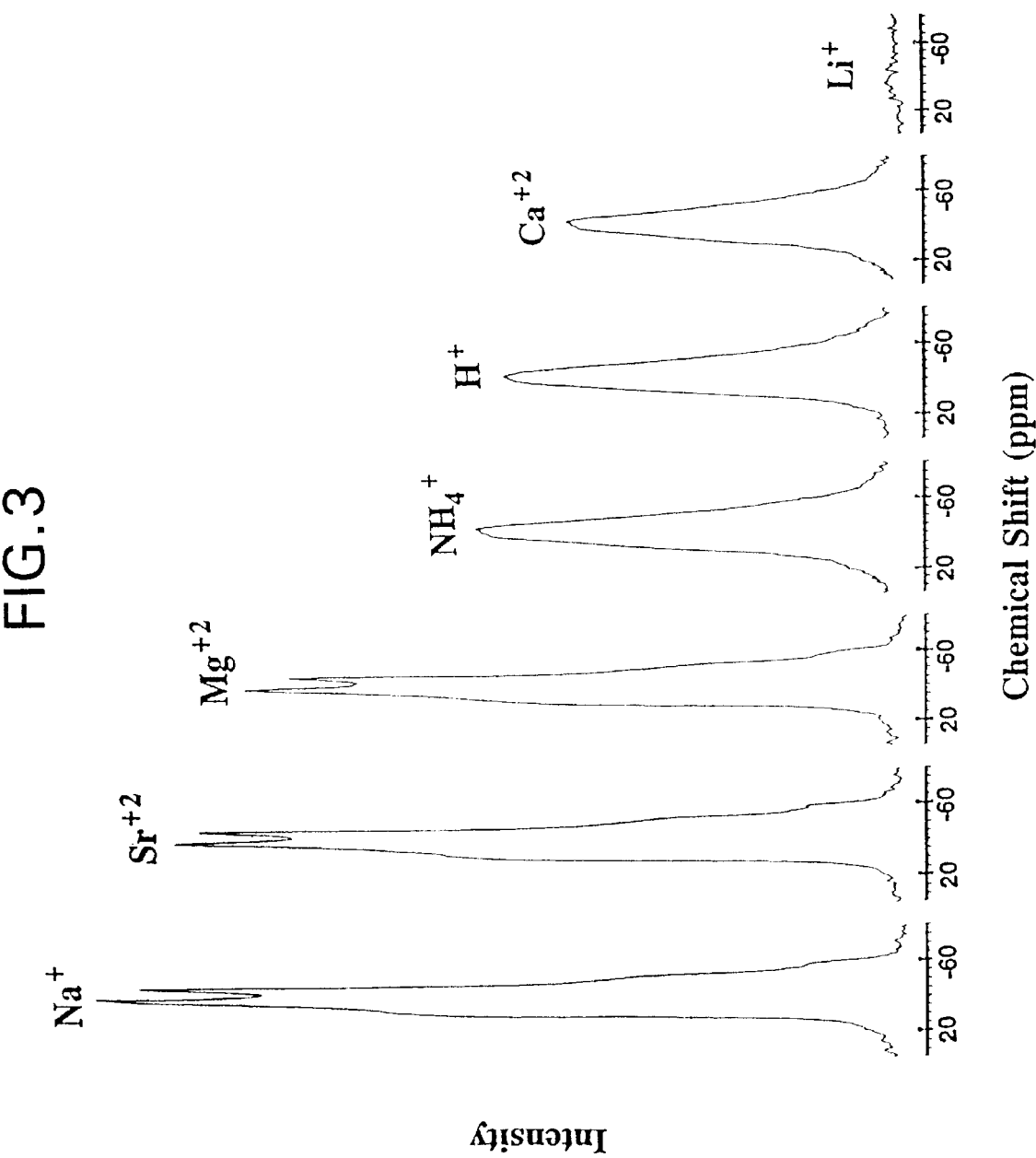
FIG. 3: Sodium NMR of ETS-14 treated by various cationic solutions showing remaining sodium after exchange. Complete displacement of sodium by lithium is evident.

What is claimed is:

1. A crystalline titanium silicate molecular sieve zeolite having a pore size of approximately 3 to 5 Angstrom units and a composition in terms of mole ratios of oxides as follows:

$1.0 \pm 0.25 M_{2/n}O : 1.00 \ TiO_2 : y \ SiO_2 : z \ H_2O$ wherein M is at least one cation having a valence of n, y is from 2 to 20 and z is from 0 to 100, said zeolite being characterized by an x-ray diffraction pattern having at least the following d-spacings and relative intensities:

| d-spacing (angstroms) | Intensity (I/I$_o$) |
|---|---|
| 8.20 ± 0.20 | s |
| 5.30 ± 0.10 | m–s |
| 3.95 ± 0.10 | w–s |
| 3.35 ± 0.05 | s |
| 3.14 ± 0.05 | w–m | and the crystallite morphology set forth in FIG. 1 of the specification.

2. The zeolite of claim 1 wherein y is from 3 to 7.

3. The zeolite of claim 1 wherein y is from 2 to 6.

4. The zeolite of claim 1 wherein M is sodium.

5. The zeolite of claim 1 wherein at least a portion of M is lithium.

6. The zeolite of claim 1 wherein M is at least 90% lithium.

7. A process for the preparation of ETS-14 molecular sieve which comprises preparing an aqueous gel capable of forming ETS-10 and heating said gel until ETS-14 crystals form.

8. A process for the preparation of ETS-14 molecular sieve which comprises mixing crystals of ETS-10 molecular sieve with an aqueous source of sodium that is essentially free from potassium and heating the resultant mixture until crystals of ETS-14 molecular sieve are obtained.

9. A crystalline lithium titanium silicate molecular sieve zeolite having the composition $1.0 \pm 0.25 \ Li_2O : 1.00 \ TiO_2 : 3–7 \ SiO_2 : 0–100 \ H_2O$, said lithium titanium silicate molecular sieve being characterized by an x-ray diffraction pattern having at least the following d-spacings and relative intensities:

| d-spacing (angstroms) | Intensity (I/I$_o$) |
|---|---|
| 8.20 ± 0.20 | s |
| 5.30 ± 0.10 | m-s |
| 3.95 ± 0.10 | w-s |
| 3.35 ± 0.05 | s |
| 3.14 ± 0.05 | w-m |

10. A cathode comprising the crystalline lithium titanium silicate of claim 9.

* * * * *